United States Patent [19]

Heiman et al.

[11] Patent Number: 6,002,918
[45] Date of Patent: Dec. 14, 1999

[54] POWER-SAVING ARRANGEMENT AND METHOD FOR MOBILE UNITS IN COMMUNICATIONS NETWORK

[75] Inventors: Frederic Heiman, Los Gatos; Patrick Pinard, Santa Clara; Andrew Werback; Michael Shiba, both of San Jose, all of Calif.

[73] Assignee: Symbol Technologies, Inc., Holtsville, N.Y.

[21] Appl. No.: 08/747,034

[22] Filed: Nov. 8, 1996

Related U.S. Application Data

[63] Continuation-in-part of application No. 08/549,051, Oct. 27, 1995, Pat. No. 5,815,811, which is a continuation-in-part of application No. 08/044,648, Apr. 8, 1993, Pat. No. 5,528,621, which is a continuation-in-part of application No. 07/799,172, Nov. 27, 1991, Pat. No. 5,280,498, which is a continuation-in-part of application No. 07/635,859, Dec. 28, 1990, Pat. No. 5,142,550, which is a continuation-in-part of application No. 07/374,452, Jun. 29, 1989, Pat. No. 5,029,183.

[51] Int. Cl.$^6$ .............................. H04Q 7/32; H04B 1/16; H04B 7/00

[52] U.S. Cl. .................. 455/38.3; 455/38.4; 455/566; 455/574; 455/343

[58] Field of Search ..................... 455/412, 414, 455/31.2, 31.3, 38.3, 38.4, 466, 503, 507, 517, 526, 566, 434, 343, 574, 500

[56] References Cited

U.S. PATENT DOCUMENTS

| | | |
|---|---|---|
| 5,465,401 | 11/1995 | Thompson ............................ 455/566 |
| 5,519,762 | 5/1996 | Bartlett ................................. 455/38.3 |
| 5,568,513 | 10/1996 | Croft et al. ........................... 455/38.3 |
| 5,584,048 | 12/1996 | Wieczorek ............................ 455/38.3 |
| 5,630,207 | 5/1997 | Gitlin et al. ......................... 455/38.4 |
| 5,649,289 | 7/1997 | Wang et al. .......................... 455/31.3 |
| 5,793,303 | 8/1998 | Koga .................................... 455/38.4 |
| 5,815,811 | 9/1998 | Pinard et al. .......................... 455/434 |

OTHER PUBLICATIONS

Wireless LAND Medium Access Control (MAC) and Physical Layer (PHY) Specifications, The Editors of IEEE, p. 802.11, May 20, 1996.

*Primary Examiner*—Willis R. Wolfe
*Attorney, Agent, or Firm*—Kirschstein, et al.

[57] ABSTRACT

A communications network comprising a cellular local area wireless network includes a plurality of access points connected to a housed computer and each other, and a plurality of mobile units each mobile unit being arranged for association with an access point. The mobile units are arranged to periodically scan for and identify the most eligible access point for association on the basis of the criteria of best quality signal strength and loading factor. In order to identify when mobile units are being removed from a predetermined area, access points having directional antennae are situated adjacent exit points to detect when mobile units are in a vicinity. Each mobile unit may include paging facilities, including the capability of transmitting information in a coded form known both to the unit and to a host, and power-saving facilities.

29 Claims, 7 Drawing Sheets

POWER-SAVING ARRANGEMENT AND METHOD FOR MOBILE UNITS IN COMMUNICATIONS NETWORK

REFERENCE TO RELATED APPLICATIONS

This application is a continuation-in part of application Ser. No. 08/549,051 filed Oct. 27, 1995, now U.S. Pat. No. 5,815,811, which is a CIP of Ser. No. 08/044,648, filed Apr. 8, 1993 now U.S. Pat. No. 5,528,621, which was a continuation-in part of Ser. No. 07/799,172, filed Nov. 27, 1991, now U.S. Pat. No. 5,280,498, which was a continuation-in-part of application Ser. No. 07/635,859, filed Dec. 28, 1990, now U.S. Pat. No. 5,142,550, which was a continuation-in-part of application Ser. No. 07/374,452, filed Jun. 29, 1989, now U.S. Pat. No. 5,029,183, issued Jul. 2, 1991. This application is related to application Ser. No. 08/344,737, filed Nov. 23, 1994 and Ser. No. 08/193,069, filed Jan. 18, 1994, now U.S. Pat. No. 5,479,441.

BACKGROUND OF THE INVENTION

1. Field of the Invention

The invention relates generally to cellular networks. In particular the invention relates to a local area wireless network including a plurality of mobile units and a plurality of access points.

2. Description of the Related Art

Wireless local area networks (LAN'S) are used in business applications such as inventory, price verification markdown, portable point of sale, order entry, shipping, receiving and package tracking. Such systems are often proprietary systems wherein the operator carries a mobile unit such as a hand-held computer communicating with a house computer via one of a plurality of access points connected to the house computer and to one another, each access point interacting with the house computer to create a wireless cell.

In order to achieve inter-operability of the various proprietary systems a draft standard IEEE 802.11 has been proposed (the IEEE 802.11 draft specification is available for public inspection).

The draft standard includes features such as 1 Mbps and 2 Mbps data rates, carrier sense multiple access/collision avoidance (CSMA/CA), a power-save mode for battery-operated mobile stations, seamless roaming in a full cellular network, high throughput operation, diverse antenna systems designed to eliminate "dead spots", and an easy interface to existing network infrastructures.

The term "roaming" relates to the scanning by each mobile unit of all access points to identify and associate with an eligible access point. Roaming between cells provides great flexibility and is particularly advantageous in locations that are difficult to wire, for simple relocation of work stations, and for portable work stations. The IEE 802.11 protocol supports either direct-sequence or frequency-hopping spread-spectrum systems, as well as infrared communications. Each access point executes a unique hopping pattern across 79 non-overlapping frequencies at a rate of one hop every 100 milliseconds, 66 hopping patterns being specified in the IEEE 802.11 draft standard and being selected to minimize the possibility of interference. Frequency hopping spread-spectrum systems are preferred by the majority of users as they allow increased capacity and decreased interference.

Although the IEEE 802.11 draft specification provides the basic packet types which can enable roaming it does not actually set the roaming algorithm. According to the draft specification the mobile unit determines the access point with which it will associate and the access point must accept the mobile unit unless it is defective or certain alarm conditions exist, such as memory full. There is, however, no suggestion of how, or by what criteria, other than those mentioned above, the mobile unit might select an appropriate access point, or the optimum access point.

U.S. Pat. No. 5,276,680 relates to a communication system including a plurality of portable units and a plurality of controllers wired to a network. Each portable unit polls all of the controllers to establish whether it can associate with any controller and receives a response from any controller having less than a predetermined number of portable units already associated therewith.

SUMMARY OF THE INVENTION

1. Objects of the Invention

It is an object of the represent invention to reduce the amount of data that need to be transmitted by wireless telegraphy.

It is a further object of the present invention to provide a communication system allowing improved selection by a mobile unit of an access point for association.

It is a further object of the present invention to provide a communication system allowing selection by a mobile unit of an access point to provide optimum operation of the system.

It is a further object of the present invention to provide a communication system providing information concerning the physical location of a mobile unit.

It is a further object of the present invention to provide a communication system adapted to prevent mobile units from being taken outside a given physical area.

It is yet a further object of the present invention to reduce the power required by mobile units, and to improve battery life.

2. Features of the Invention

According to the present invention, there is provided a wireless communications network comprising a mobile unit and a base unit, a first one of said units being arranged to transmit a message to a second one of said units, said message having associated with it a coded portion representative of possible responses to the message, and said second unit being arranged to decode said coded portion and to offer to a user a plurality of options corresponding to said possible responses.

Typically, the network will include a central base station or house computer which is in communication with a number of hand-held units, such as portable computer terminals or bar code scanners. In the preferred embodiment, messages may be transmitted from the central computer to one of the mobile units by transmitting an addressed message by wireless telegraphy. That message may include text and/or graphics, along with a coded portion defining several possible answers to the message. The receiving mobile unit decodes the coded portion, and displays not only the message but also the possible options on a screen. The user may then select the option, for example by touching a touch-sensitive screen, to reply. The response then goes back to the base unit in coded form, thereby reducing the amount of data that has to be transmitted across the wireless portion of the network.

Both the base unit and the mobile unit preferably include an information store, such as a hard disk and/or a random access memory. The stores contain common information enabling coded messages to be sent and decoded in a previously-agreed way. In addition to the encoded information representing possible responses to messages, it may also represent textual data records which are present in both the store of the mobile and the store of the base unit.

In addition, in a further preferred embodiment, messages may be transmitted using a tree-like data structure. Encoded portions of the message, understood both by the mobile unit and the base unit, may define the manner in which the tree is built up. When the mobile unit decodes these portions, it may display to the user, for example on a screen, the full structure of the message. This may conveniently be done by displaying to the user a nested sequence of menus, each menu having several user-selectable options. Some or all of these options may not only allow the user to select a sub-menu, but may also activate a coded response back from the mobile unit to the base unit, thereby providing the base unit with information on which options have been selected by the user.

The common information stored within the base unit and within the mobile unit may be user-definable and updatable. One way of achieving this is to provide a cradle, attached to the base unit, into which the mobile unit may be placed when it is not in use. Electrical connections on the mobile unit and one the cradle allow information within the mobile unit to be downloaded into the base unit. Similarly, information may be uploaded from the base unit to the mobile unit.

Alternatively, the information store within the mobile unit may be removable (for example a removable read-only memory). The read-only memory containing one particular set of encoding information may then be replaced, at will, with another read-only memory containing another set. In that way, the mobile unit may easily be re-programmed for a variety of different applications.

There may be several mobile units on the network, each having a different set of encoding information. All of the various sets may be maintained simultaneously at the base unit, and the communication between the base unit and any given mobile unit is then encoded according to its own individual information set.

According to a further aspect of the invention there is provided a mobile unit for use with a wireless communications network, said unit including a radio transmitter/receiver and a timer for instructing said radio to enter a power-saving mode after a period of no message traffic; said radio automatically reverting to normal powered operation when a radio signal is received or is to be sent by said radio. The invention also extends to a corresponding method of operating a mobile unit within a wireless communications network.

According to the invention there is also provided a data communications network including a plurality of stationary access points and a plurality of mobile units, a mobile unit being capable of communicating with at least two access points in a predetermined range therefrom, comprising:

means in the mobile unit to scan for and associate the mobile unit with the most eligible access point at predetermined intervals, the most eligible access point being selected according to each of the following criteria:

(a) received access point signal quality; and (b) loading factor at the access point.

Accordingly, a simple and reliable arrangement is provided enabling preemptive roaming and optimum selection of an access point for association with a mobile unit.

Each mobile unit may select a group of eligible access points and select the most eligible access point from that group. The received access point signal quality may be represented by the received signal strength indication (RSSI). The loading factor may be defined by the number of mobile units associated with a given access point. The cellular communications network may comprise a 1 Mbps frequency-hopping spread-spectrum wireless LAN conforming to the IEEE 802.11 draft specification.

Each mobile unit may send out a probe message packet to all access points wherein the probe packet has no destination address but a mobile unit specific source address. The probe packet may include an identification of the access point with which the mobile unit is currently associated. Each access point that detects the probe packet may send a probe response packet containing the following information:

access point address;

access point frequency hopping pattern;

access point present channel;

time remaining in present channel;

loading factor.

The mobile unit may carry out its selection on the basis of the signal quality of, and information contained in the received probe response packets or the access point signal quality may be determined from a beacon signal sent by the access point independently of a probe response packet.

Each mobile unit may store the RSSI value for each access point and calculate an average value over a predetermined period, and RSSI values outside a predetermined range may be omitted from the averaging calculation.

Each mobile unit may carry out a full scan of all available frequency channels on power-up and thereafter at regular intervals. The full scan may be carried out at approximately thirty second intervals. Each mobile unit may carry out a partial scan of known access points at regular intervals more frequently than a full scan is carried out, for example at approximately five second intervals.

Each mobile unit not associated with an access point may identify on scanning all access points with signal quality equal to or above a threshold value and select for association the access point having the lowest loading factor; when two or more access points have an equal lowest loading factor the access point having the highest RSSI value may be selected. The threshold value may be set at six counts below the highest detected RSSI value.

A mobile unit associated with an access point and experiencing an unacceptably low communication level may roam excluding the current access point from selection. The unacceptably low communication level may be achieved when more than 50% retries, CRC errors or missed beacons are experienced. The excluded access point may be re-included for selection when its RSSI value has increased by a predetermined limit. If not eligible access points are identified for re-association the mobile unit may continue to associate with the current access point.

A mobile unit associated with an access point and achieving a satisfactory level of communication may make a scanning decision at predetermined intervals. A satisfactory communication level may be achieved when 50% or less retries, CRC errors or missed beacons are experienced. An eligible groups may be selected comprising all access points with signal quality above a predetermined threshold, the group including the current access point when its signal quality is above a further predetermined threshold, and the access point may be selected having the lowest loading factor; access points having a loading factor of more than a given proportion of the current access point loading factor may be excluded and where two or more access points have the same loading factor, the access point having the highest signal quality may be selected. The eligible group threshold value may be six counts below the highest received RSSI value, the current access point further threshold value may be eleven counts below the RSSI value, and access points having a loading factor of more than 75% of the current access point loading factor may be excluded.

Each mobile unit may carry out a partial scan of known access points at predetermined intervals and may carry out the roaming decision immediately after the partial scan.

The communications network may be included in one of an inventory, price verification, mark-down, portable point of sale, order entry, shipping, receiving and package tracking systems.

According to the invention there if further provided a mobile unit for use in a cellular communications network comprising a plurality of access points, the mobile unit including a communications system for association with an access point and a selection system for scanning all access points, selecting a group of eligible access points for association and selecting from that group a most eligible access point, selection being carried out according to the following criteria:

a received access point signal quality; and loading factor.

According to the invention there is further provided a cellular communications network comprising a plurality of mobile units and a plurality of access points, the mobile unit being arranged to roam and associate with a selected access point, the mobile unit including a selection system for selecting a group of eligible access points for association and selecting form that group the most eligible access point, selection being carried out according to the following criteria:

received access point signal quality; and loading factor.

According to the invention there is further provided a method of operation of a cellular communications network, the network including a plurality of access points in communication with each other and a plurality of mobile units wherein:

each mobile unit scans for and associates with the most eligible access point at predetermined intervals, each mobile unit selecting a group of eligible access points and, from that group, selecting the most eligible access point according to the following criteria:

received access point signal quality; and loading factor.

According to the invention there is yet further provided a data communications network including a plurality of stationary access points and a plurality of mobile units wherein:

each mobile unit scans for and selects as eligible access point for association therewith on the basis of received access point signal quality and loading factor at the access point and wherein:

a physical area is defined within which all mobile units must be kept and access points are provided adjacent the or each exit point from the physical area.

The access point at the exit point may include a directional (horn) antenna providing a strong signal in the vicinity of the exit point.

The novel features which are considered as characteristic of the invention are set forth in particular in the appended claims. The invention itself, however, both as to its construction and its method of operation, together with additional objects and advantages thereof, will best be understood from the following description of a specific embodiment, when read in conjunction with the accompanying drawings. It is to be understood that the invention may be carried into practice in a number of ways, and the described embodiment is not intended to be limiting.

BRIEF DESCRIPTION OF THE DRAWING(S)

DETAILED DESCRIPTION OF THE PREFERRED EMBODIMENT

Figure 1:
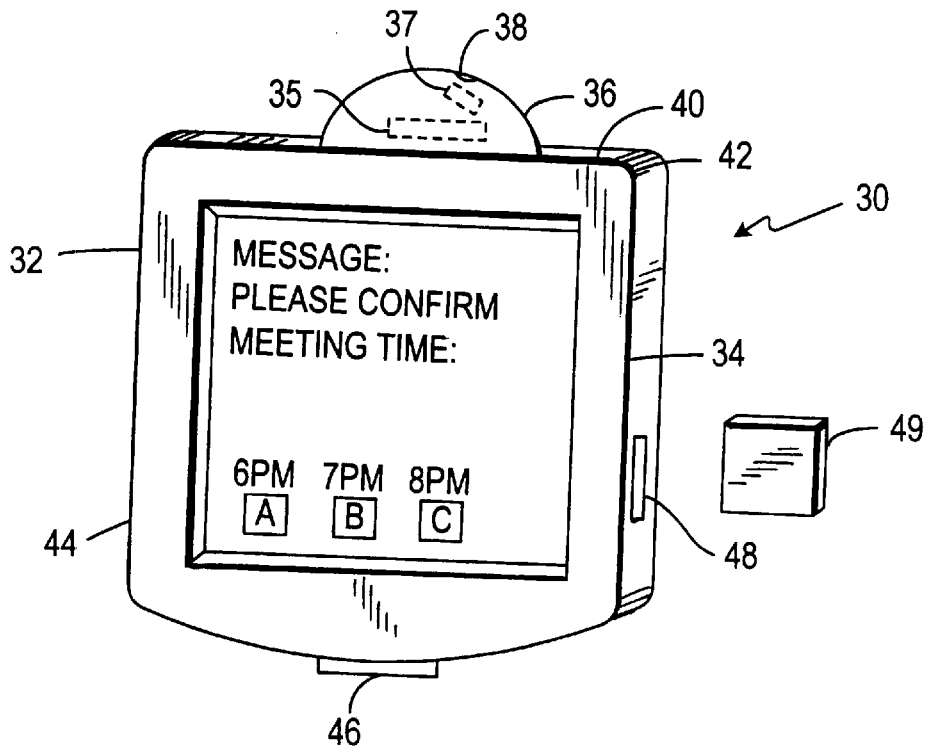
FIG. 1 is a schematic view of a radio terminal suitable for use in a preferred embodiment of the present invention.

Turning first to FIG. 1, there is shown a portable radio terminal suitable for use as a mobile unit in a preferred embodiment of the invention. The radio terminal or mobile unit 30 has a housing 32 of a suitable size either to be hand-held, or to be attached to a user's wrist or forearm by means of a rear strap (not shown). The front of the housing has a touch sensitive screen 34 which is used not only to display information, but also to input data, for example by pressure of the user's finger or of a pen on the screen surface. The unit includes a radio transmitter/receiver 35 and a laser-based optical scanning mechanism, both contained within a generally spherical rotational housing 36. The optical scanning mechanism produces a one-dimensional or two-dimensional pattern of scanning laser light, which leaves the housing 36 via an aperture 38. The laser light impinges upon an indicia to be read (not shown), for example a bar code, and is reflected back to the mobile unit 30 where it is detected. The radio transmitter/receiver is arranged to communicate with a base unit or backbone house computer 4, shown schematically in FIG. 3. The house computer 4 may include one or more data entry terminals or screens 4a, and a hard disk or other data storage device 4b.

The mobile unit 30 remains in wireless communication with the house computer 4 via the radio-transmitter/receiver 35. This may receive and transmit not only textual data, entered via the touch-sensitive screen 34, but also data representing a bar code which has been scanned by the optical scanning mechanism 37.

Figure 3:
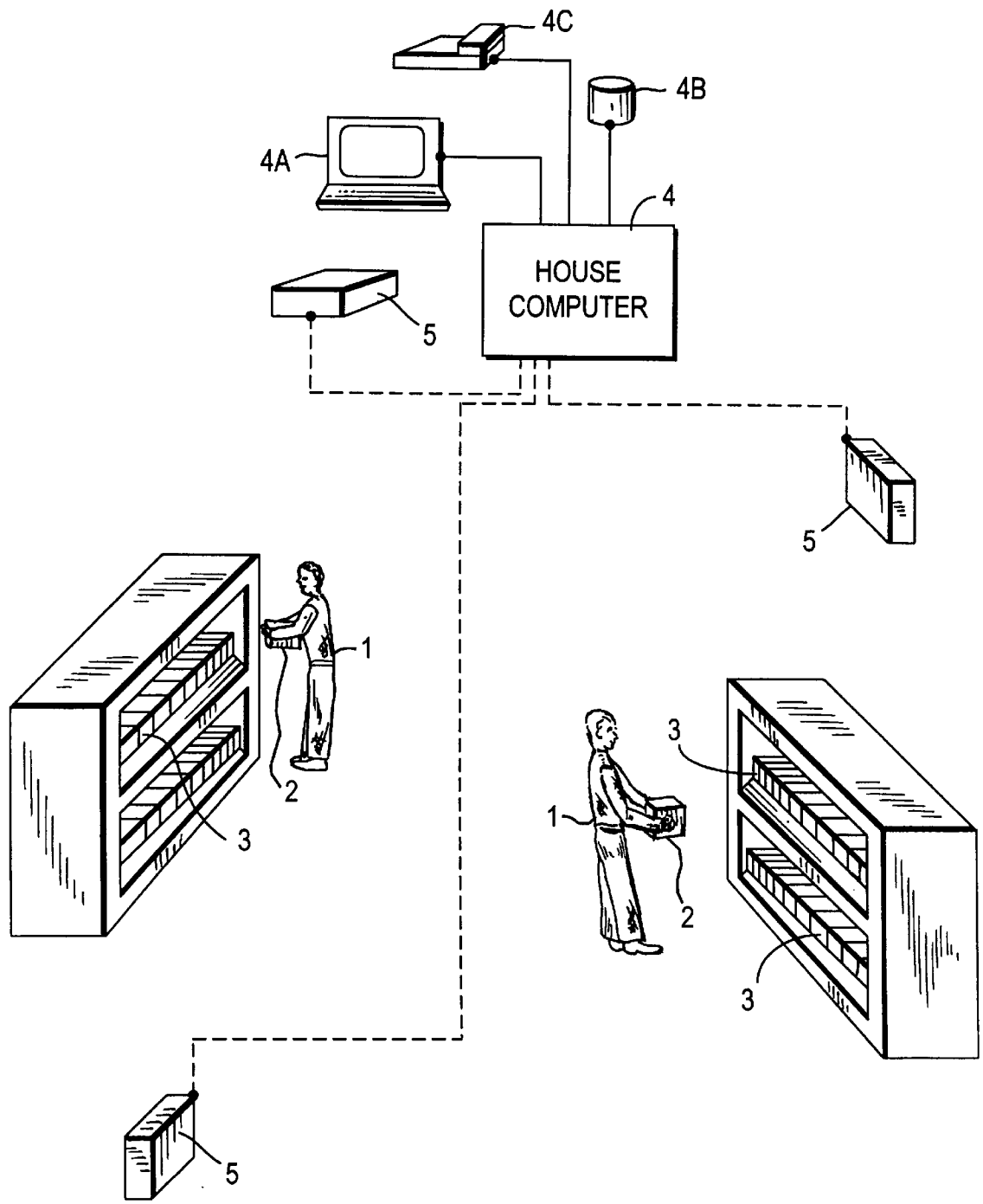
FIG. 3 is a schematic illustration showing the communication system of the preferred embodiment in operation.

In the preferred embodiment of the invention, the mobile unit 30 includes a fixed or removable memory 49; if the memory is designed to be removable, a slot 48 in the housing is provided for that purpose. The unit also includes an electrical connection 46 allowing the information in the memory 49 to be downloaded to the house computer 4 when the unit is returned to a docking station 4c (FIG. 3). Additionally, the information stored in the memory 49 may at that state be updated under control of the house computer 4.

In addition, the mobile unit 30 includes an LED 40, and a miniature speaker 42.

Figure 2:
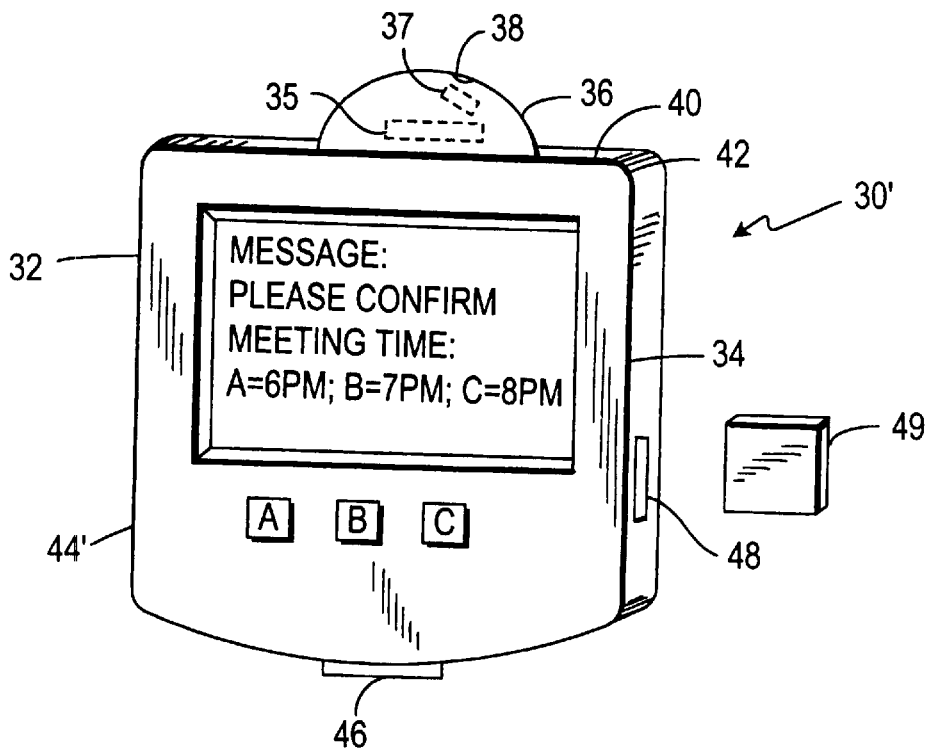
FIG. 2 shows an alternative embodiment to that shown in FIG. 1.

FIG. 2 shows an alternative embodiment which differs from the embodiment of FIG. 1 merely by having a series of true buttons, or a keyboard 44'.

Figure 2B:
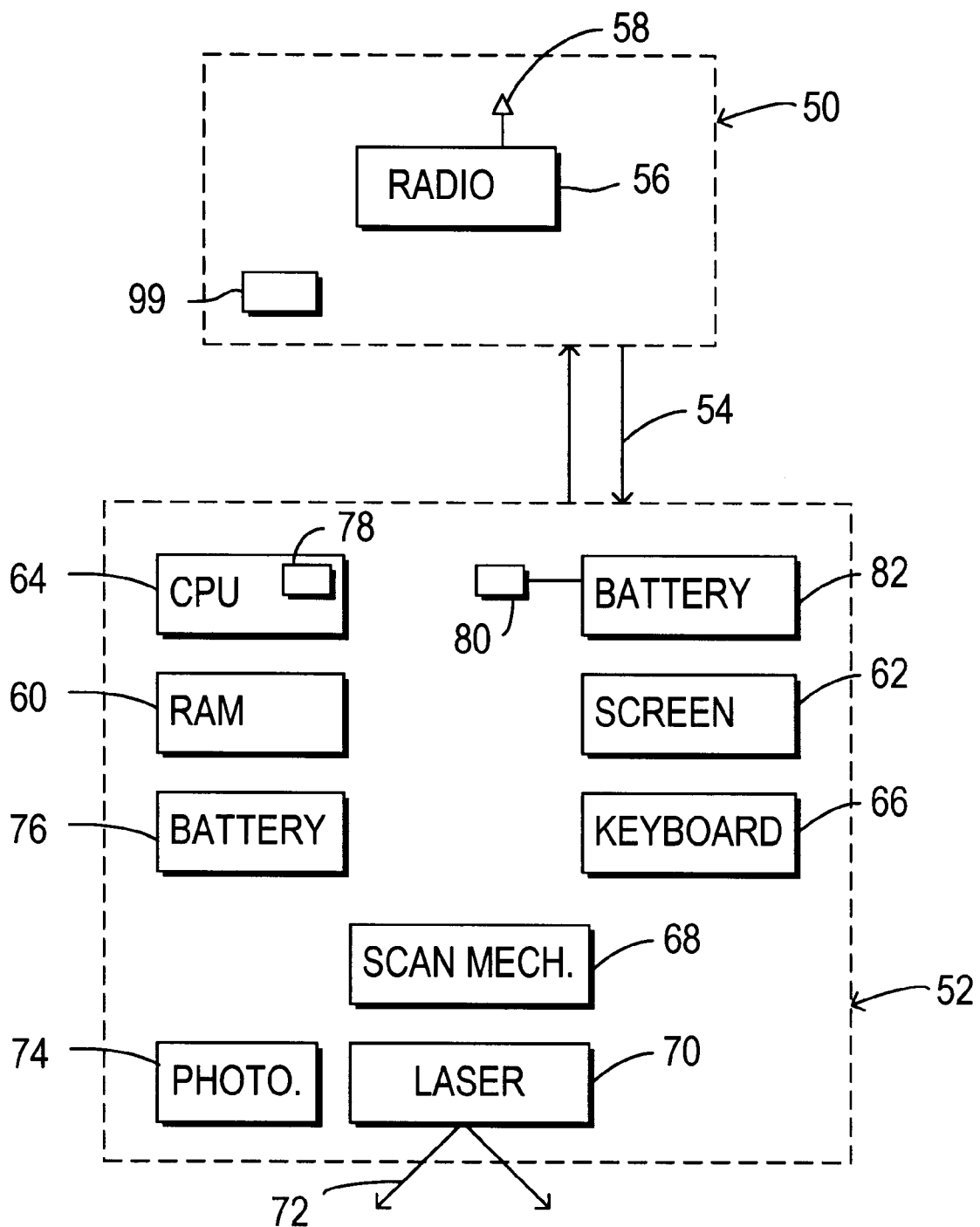
FIG. 2B shows, schematically, the functional elements that make up the radio terminals shown in FIGS. 1 and 2.

FIG. 2B shows, in purely schematic form, the major structural elements that go to making up a mobile unit of the type shown in FIG. 1 or FIG. 2. Each of the elements is known per se, and it will be evident to a skilled man in the art how to link them into a unit which operates as described.

As shown in FIG. 2B, the mobile unit has two basic portions, a radio section generally indicated at 50 and a terminal section generally indicated at 52. These two sections communicate with each other via an interface 54.

The radio section 50 incorporates a radio transmitter/receiver 56 and an aerial 58 for communicating with a remote access point 5 (FIG. 3).

The terminal section 52 includes a random access memory 60, a screen 62, a CPU 64 and an optional keyboard 66. In addition, for scanning operations, the section is provided with a scanning mechanism 68 and a laser and optics assembly 70 for producing an outgoing scanning laser beam 72. The reflector beam is detected by a photodiode 74. All of these devices are operated by a main battery 76.

The CPU 64 includes a clock 78. A further CMOS clock 80 is also provided, which has its own battery 82. Accordingly, the unit is capable of keeping track of the time even when the CPU 64 is powered down.

In the preferred embodiment, the mobile unit 30 may double as a personal pager, with messages and other information being transmitted to and from the house computer 4. In a typical prior art pager, messages are transmitted in textual form, both to and (if the pager has the capability) from the remote unit. The embodiment shown in FIG. 1 however, has an additional capability which may significantly reduce the amount of information that has to be transmitted across the wireless link.

In the preferred embodiment, common coded information is stored both within the memory 49 of the mobile unit, and centrally on the house computer 4, for example on the hard disk 4c. This enables textual information to be transmitted b way of short codes, with both the transmitting unit and the receiving unit being party to the same code protocol.

For example, if a user wishes to send a message from the house computer 4 to a mobile unit 30, he simply types the message to be sent on the terminal 4a. Attached to the message may be a series of codes A,B,C which represent possible responses to the message. In the example shown in FIG. 1, the message is "please confirm meeting time", with the possible responses being A-6 pm; B-7 pm; C-8 pm. On receipt of the codes A,B,C, the mobile unit decodes them using information stored within the memory 49, and displays the corresponding text on the screen 34. In addition, the screen may also display virtual "buttons" 44 that the user may press to respond to the message. For instance, if the user wishes to confirm that the meeting time is 6 pm, he simply presses the screen at the position shown by the virtual "button" A, which instructs the radio-transmitter/receiver 35 to send a coded A signal back to the house computer 4.

Figure 1A:
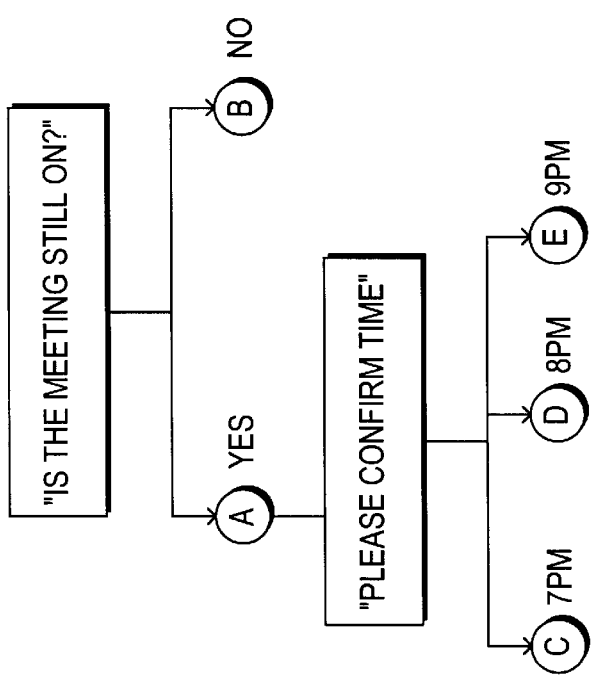
FIG. 1A shows an exemplary structured message that may be received by the unit of FIG. 1.

It will of course be understood that in a practical embodiment, the codes A,B,C will be encoded bit-wise for wireless transmission. The three buttons shown accordingly require the transmission of just two bits of information across the wireless link. It is of course envisaged that there may be more or fewer than three buttons, and that the number of buttons may be selected by the person sending the message. In a further development, the message sent may be represented by a tree-like data structure; this is shown in FIG. 1A. In that example, the message appearing on the user's screen is "is the meeting still on?", along with two options: A-YES and B-NO. If the user selects A, a further message appears—"please confirm time"—along with three further options: C-7 pm, D-8 pm and E-9 pm. The user then selects either C, D or E and a coded message is sent back to the house computer which is there decoded according to the information stored on the hard disk 4b. On the other hand, the user may select option B, in which case the coded message is sent back informing the house computer that the meeting has been cancelled.

Figure 1B:
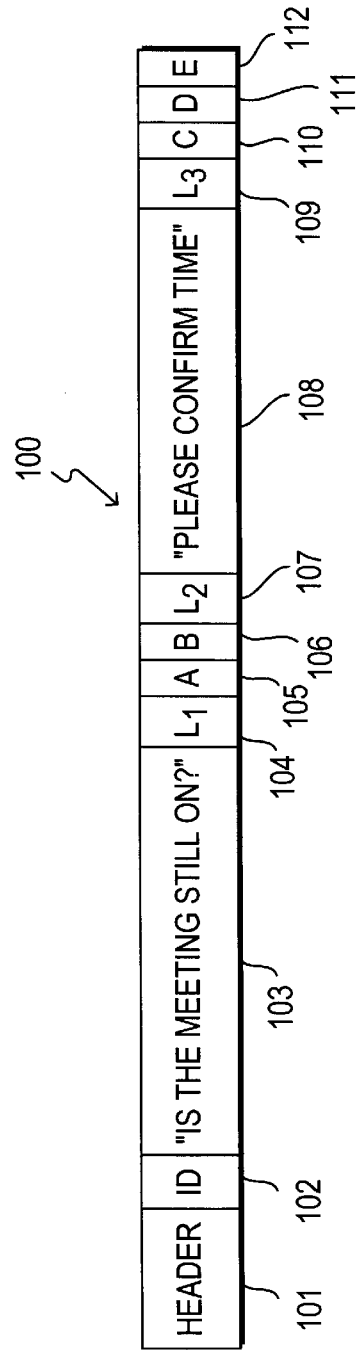
FIG. 1B shows one preferred form in which the message of FIG. 1A may be transmitted over the wireless link.

FIG. 1B shows one form in which the message structure shown in FIG. 1A may be transmitted from the house computer 4 to the mobile unit 30. The message 100 starts with a header 101, an identifier 102 which identifies the particular mobile unit that the message is directed to, followed by the first textual part of the message 103. Linking information 104 follows, which defines where the textual part 103 is linked to the options to be presented to the user at that point. That is followed by coded information A 105 and B 106, representing respectively "YES" and "NO". Further linking information 107 follows, which indicates how the next textual message 108 is to linked to the data structure previously defined. Further linking information follows, specifying how the textual information 108 is to be linked to the subsequent codes C 110, D 111 and E 112.

Other equivalent message structures could of course be devised by those skilled in the art.

In a practical embodiment, there will of course be several individual mobile units 30, each with its owe identifier. Messages transmitted by the wireless system may be addressed to a particular unit by means of the ID 102 (FIG. 1b). Since each unit decodes only messages which are intended for it, it is possible for different units to use a different series of codes A,B,C and so on when communicating with the house computer 4. The house computer 4 in that event maintains information simultaneously on several different encoding protocols, and chooses the appropriate protocol according to the particular mobile unit that is to be addressed, or from which a message has been received.

FIG. 2 shows an alternative mobile unit 30', which is identical with the unit of FIG. 1 except that the user responds by pressing one of a series of true buttons 44' on the housing 32. In this embodiment, the screen 34 needs to indicate specifically to the user which button represents which response the buttons 44' may be in addition to or may comprise a form of the numeric keyboard.

Figures 4, 6:
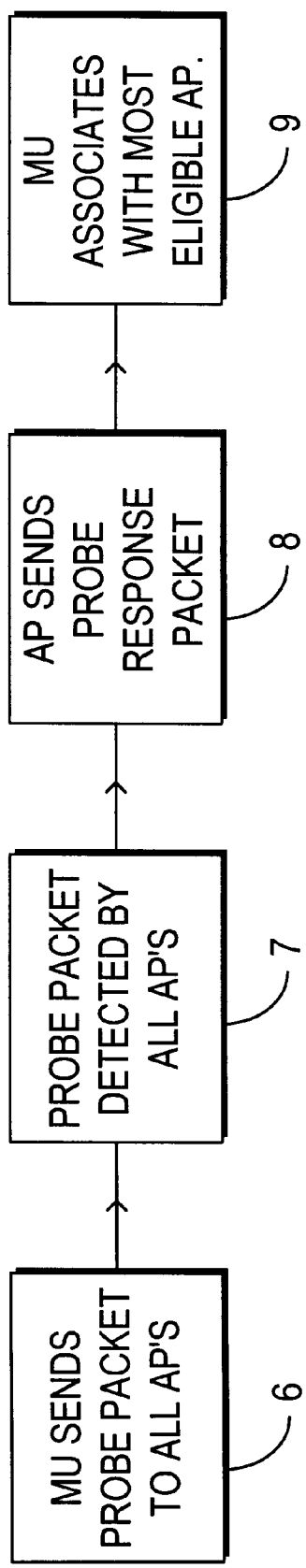
FIG. 4 is a block diagram illustrating the steps carried out by a mobile unit during the roaming process.
FIG. 6 shows a probe response message typically sent by an access point according to the present invention.
Figure 5:
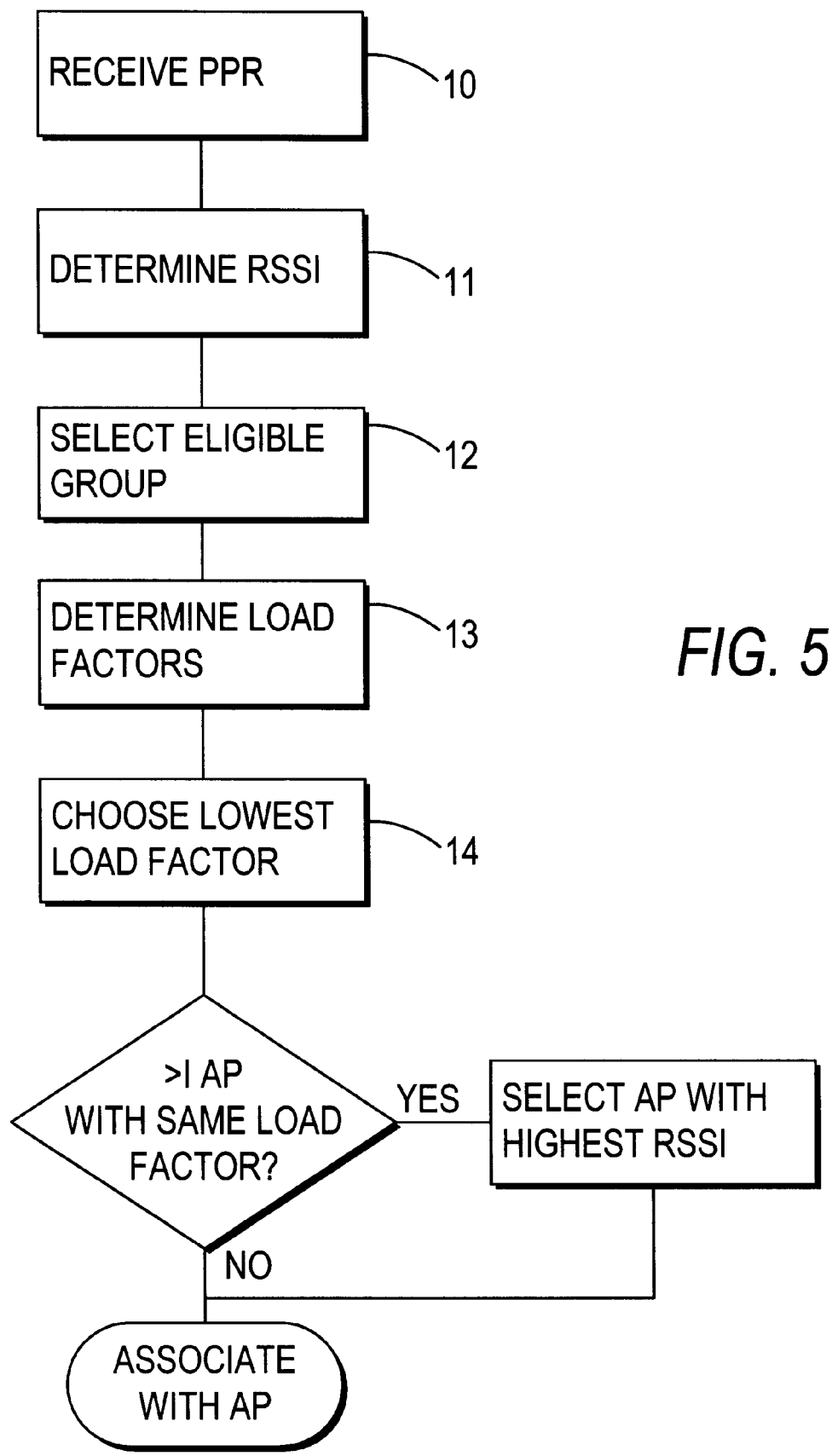
FIG. 5 is a flow chart illustrating the steps carried out by a mobile unit for selection of the most eligible access point.

Referring now to FIG. 3, there is shown a further application of a cellular wireless communication system, in the field of inventorying. One or more operators 1 each carry a mobile unit 2, such as a portable computer (or a unit as shown in FIG. 1 or FIG. 2). Information concerning the items 3 to be inventoried is entered into the mobile unit 2, for example by scanning bar code symbols on the items 3. In order to communicate the information obtained to a backbone house computer 4 a plurality of access points 5 are provided each connected to the house computer 4 and one to another, each access point 5 together with the backbone house computer 4 forming a cell. The house computer 4 may include a screen 4a and a hard disk or other data storage device 4b. One or more docking stations 4c may also be provided for receiving unit 2 or and for downloading the information stored therein. Depending on the location of the operator 1 it is desirable that the mobile unit should select the optimum access point; in addition, if conditions change, for example if the operator 1 changes position, it is desirable that the mobile unit 2 should, if necessary, re-associate with a new access point if the current access point 5 does not allow a satisfactory performance or the new access point offers an improved performance. The mobile unit 2 and access points 5 are arranged for wireless communication at radio frequencies, for example, 2.4 GHz in the industrial scientific medical (ISM) band. The steps carried out by a mobile unit 2 which is not currently associated to an access point in selecting an access point are shown in FIGS. 4 and 5. As shown in the block diagram of FIG. 4 the mobile unit (MU) firstly sends out a probe packet (6) to all access points (AP). The probe packet contains the mobile unit source address but has no destination address and hence any access point that detect the probe packet must send a response. Accordingly, the probe packet is detected by all access points within range (7) and each of those access points sends out a probe response packet (8).

The form of the probe response packet is shown in FIG. 6. The information contained therein includes the access point address, the hopping pattern, the present channel, time left in the present channel, the loading factor (discussed in more detail below) and any other timing information that may be required. Returning to FIG. 4 the mobile unit associates with the most eligible access point based on the probe response packets that it receives.

Referring to FIG. 5 the mobile unit selects the most eligible access point in the following manner:

As each probe packet response (PPR) is received (10) the signal quality of the response is measured by determining the received signal strength indication (RSSI) (11). For reference, RSSI values generally vary from 25 to 60, with good communications experienced above approximately 35. In practice, rather than relying on a single instantaneous value, the RSSI information for each access point is placed in a table in the memory of the mobile unit and is updated each time a probe response packet is received form that access point. In order to minimize fluctuation the RSSI value for each access point in the table is averaged over a predetermined number of responses. It has been found that large variation in the RSSI values for a given access point have been recorded even when measured by a stationary mobile unit, varying by as much as 15 counts over one minute, and in order to reduce the range of values and minimize "slow thrashing". When "thrashing", a mobile unit associates with a first access point, then roams to a second access point after a short period of time and then further access points in a random manner without any long attachment to a single access point; the expression "slow thrashing" may be interpreted accordingly. The averaging calculation may include the step of discarding values outside a given range, for example ten or more counts below the average RSSI value.

Once the RSSI values have been calculated, an "eligible group" of access points is selected (12), including all access points having an RSSI value no more than six counts below the best detected RSSI value. From that group the access point having the lowest load factory (LF) is determined (13,14). The load factor is a measure of how many mobile units are currently associated with a given access point; in the present case the load factor is represented by a simple numerical value representing the exact number of associated mobile units. The access point thus selected is the most eligible access point and the mobile unit then selects that access point for association. If more than one access points within the eligible group exhibit the same load factor then, of those, the access point having the highest RSSI value is selected as the most eligible access point and the mobile unit associates with that access point.

The mobile units are programmed to carry out an update probe at predetermined intervals. In the present embodiment each mobile unit carries out a full scan, probing all seventy nine channels, upon power up and every thirty seconds. Full scans last approximately 100 ms. In addition partial scans, covering known access points, are performed every five seconds. The probe response packet transmitted by an access point contains all necessary synchronization information for a mobile unit to latch on to the current channel of the access point and follow the hopping pattern at any stage. In an alternative arrangement the RSSI value for the access point is calculated not from the strength of the probe response signal but from the strength of the "beacon packet" issued by the access point. Each access point issues a beacon packet every 100 milliseconds containing, in addition to other information, timing information similar to that contained in the probe response packet. A slightly different approach is taken where a mobile unit is currently associated with an access point but at a communication level that is unsatisfactory. An unsatisfactory communication level may be identified, for example, when more than fifty per cent retries, cyclic redundancy code (CRC) errors or missed beacons are detected. In that case the mobile unit will re-associate using the steps illustrated in FIGS. 4 and 5 except that the access point with which the mobile unit was experiencing poor communications will be excluded from the eligible group of access points (see step (12) of FIG. 5). The ineligible access point can, however, in due course be re-admitted to the eligible group after a succession of acceptable RSSI values have been observed. It should be noted that a mobile unit experiencing poor communication will re-associate only if an eligible access point is identified.

In cases where a mobile unit is not experiencing an unsatisfactory communications level (as defined above) it makes a roaming decision every five seconds after a partial scan. Once again the steps described above with reference to FIG. 5 are carried out, but with the following modifications:

1. The current access point is included in the eligible group if its RSSI value is no more than eleven counts below the best RSSI value.

2. When choosing the access point having the lowest loading factor in the group, access points having a loading factor which is more than 75% of the loading factor of the current access point loading factor are excluded.

The additional steps enable the mobile unit to avoid "frivolous roaming" that is to say, re-association with new access points when the current access point is in fact satisfactory.

The system thus allows preemptive roaming providing for dynamic load balancing, that is, a mobile unit may re-associate with a new access point although it is not experiencing poor communications with a current access point, but the newer access point will offer considerably improved communications. The possibility of a mobile unit losing contact with an access point altogether and experiencing periods where it is not communicating with any access points, may thus be avoided.

In addition, the system has been improved by adjusting the sensitivity so that a mobile unit will not tend to roam from a current associated access point to another at the rate that it would otherwise, where the signal strengths of various access points are similar in magnitude. Accordingly, greater stability is achieved.

In a further modification the probe packet may include an identification of the access point that the mobile unit is currently associated with for example, the BSS ID. Such an arrangement would be more reliable than the messages passed between access points relaying re-association events.

The mobile units may incorporate a number of power-saving features, aimed at maximizing battery life. These features (known as "power-saving protocols" (PSP), will now be described in more detail.

With reference to FIG. 2B, there are generally two reasons why the radio section 50 and the CPU 64 may need to be active. The first reason is to be able to send and receive network messages via the aerial 58. The second is to allow the radio section 50 to communicate with the terminal section (sometimes called the "host terminal") 52 via the interface 54. In particular, access may be needed to the protocol stack, typically stored in the RAM 60, which is required for operating the PSP.

The PSP makes use of a number of different algorithms, all of which are based on the approach of turning off of the radio 56 and halting the CPU clock 78 while waiting for the next message from the access point. It will be recalled that the basic message control system is defined in IEEE 802.11 protocol specification, and involves the use of beacon messages with traffic indicator maps and a poll message to request transmission of the data.

The various PSP algorithms are defined in such as way as to allow a user-definable tradeoff between performance and the level of power saving.

The first algorithm is a static algorithm that wakes up the radio 56 just in time to receive very broadcast beacon. Even thought the CPU clock 78 has been powered down, the system still maintains a record of the time using the CMOS clock 80, which is powered by its own miniature battery 82. A similar second algorithm wakes up the radio 56 in time to receive every other beacon. Similarly, algorithms 3 to 10 switch on the radio in time to receive, respectively, every third to every tenth beacon.

An eleventh algorithm is dynamic, and permits the wakeup singals to be based on the actual message traffic. Whenever the radio section 50 sends a message, or whenever it receives a message, it sets the wakeup interval to a minimum value (usually to wake up in time to receive each expected beacon). This provides for a fast response as long as the traffic is continuous, or almost so. If no activity is detected, the algorithm provides for the wakeup interval to be gradually reduced, typically linearly, up to a maximum value of 10; in other words, at that point the radio is woken up just in time to receive every tenth beacon. Alternatively, instead of the delay increasing linearly (intervals of 1,2,3 . . . ), the algorithm may remain on maximum for a predefined period, with the delay increasing to a maximum value only once that period has been reached.

Yet a further algorithm, known as algorithm number 12, provides for even higher performance. In this algorithm, a record is kept of message traffic (based for example on the number of payload bytes or on the number of messages), and when a threshold is exceed the radio 56 is then switched into continuous mode. As long as significant traffic is being processed, either outgoing or incoming the radio will stay in continuous mode. However, if the traffic falls below the predefined threshold for a certain number of second (for example 5 seconds), the system then reverts back to algorithm number 11.

For all of the algorithms previously mentioned, the time of the next beacon is of course precisely known, and may be computed so that the radio can be turned on just in time to receive the beacon. If the beacon is displayed in the access point 5 (due for example to pre-existing traffic), then the radio 56 will stay awake for some predefined period of time to ensure that the beacon is received.

Preferably, all mobile units respect the expected time of the beacon and do not transmit messages that might cause the timing of the beacon to be delayed.

If a mobile unit misses a beacon (either because it is not heard, or because it is received with an error), then the unit automatically schedules a wakeup for the next beacon, even if it would not normally expect to wake-up for that particular beacon based on the current algorithm in use. This permits fast recovery from message errors, and also helps to detect that the access point 5 is or is not transmitting beacons in a minimum amount of time.

The mobile unit is capable of going into a number of operating states or modes for managing the status of the radio 56 and the interface 54. To minimize power, the radio 56 is turned on only if radio activity is required, even through the radio unit 50 itself may need to be powered up to allow communications with the terminal section 52. If the radio section 50 powers up to communicate with the terminal section, and it becomes time to receive or to transmit a message, then the radio 56 is automatically powered up. Whenever the radio is no longer needed, but the interface 54 remains active, the radio may be powered down in order to save power. When the radio section 50 has no requirement to communicate either via the interface 54 or via the aerial 58, all elements of the radio are powered down, as is the CPU clock 78. The system then awaits a wakeup call either from the beacon timer or from the terminal section 52 (for example because the user has activated the scanning mechanism 68).

If the mobile unit is unassociated with an access point, it may remain in power save mode. In that mode, it automatically wakes up to search for an access point periodically (for example every second), thereby minimizing use of power but still providing a reasonable capability of finding an access point with which the unit can associate fairly rapidly. Once the mobile unit has associated with an access point, it needs to wake up only in order to receive beacon messages.

The mobile unit preferably provides close coupling between the radio section 50 an the terminal section 52, in order to provide appropriate network support with minimum power usage. The units typically have an active mode (either full power or power-save mode), a suspend mode (all unnecessary items are off but the CPU can resume at any time), and a power-off mode (minimum power, with no internal activity except for the CMOS clock 80, but still able to resume from where it left off before the power was cut).

The radio section 50 is tightly integrated with the terminal section 52 in several ways, thereby permitting joint power saving modes. Firstly, the radio section may be set to remain in its prescribed operating mode whenever the terminal section 52 is active. Second, when the terminal section 52 goes into suspend mode, the radio section 50 is placed in a low power mode automatically. This may for example be the PSP algorithm number 10, described above. In this mode, the radio section is capable of receiving messages directed to the terminal section 52. Options exist to allow either directed packets only, or directed and broadcast/multicast packets. These options allow the customization of the network to minimize power by minimizing wakeup events. When a qualified packet is received, the radio section places the data in a buffer within the ram 60, and wakes up the terminal section 52. As the terminal section may required some time to wakeup, radio section may buffer received packets until such time as the terminal sections able to process them.

While in the suspend mode, the radio section has the option of powering itself down if no activity has been detected for a programmable amount of time, for example 1 hour. This allows a mobile unit that has been left inactive, or has gone out of range, to limit battery consumption to a reasonable amount.

If the terminal has been turned "off" (left in a powered but fully inactive state), the radio section 50 is automatically put to sleep, the lowest level of power consumption. In this mode, it does not respond to messages or to wakeup commands. When the terminal sections is then powered up ("Resume"), the radio section itself then automatically powers up and resumes form its present state.

If the terminals section loses power (for example if the battery 76 is removed), the radio section is automatically switched off or otherwise powered down. In that mode, the battery 82 may act as a backup battery, able to sustain the operating state of the terminal section. Alternatively, a separate backup battery (not shown) may be provided. When the battery 76 is reinserted or an alternative power source such as the mains becomes available, the terminal section is able to resume with no loss of data, automatically powering itself up and reconfiguring the radio section with no intervention required by the operator. After the radio section has been reconfigured, it scans in the normal way for access points and re-establishes association with the network.

The terminal section and the radio section may also be provided with further functionality to prevent a lockup state occurring between the two sections during a suspend or power-down operation. Here, the terminal section interrupts the radio section and commands that no wakeup operations be generated for a minimum interval (for example 1 second). During that interval, the terminal section can then safely suspend or power-down. After that internal has elapsed, the radio section is free to wakeup the terminal section when a message is received.

The terminal section and the radio section may coordinate communications using a command register and an interrupt. In one embodiment, the radio section 50 may include a programmable wakeup timer 99. The radio section 50 may then be worked up either by that timer, or by a message via the aerial 58, or by a command received from the terminal section 52 via the interface 54.

In order to synchronize the interface 54, the terminal section may generate one of three commands, with the radio section responding with a ready flag. The three commands are Awake for Host, Resume, and Sleep. These cause the radio section to execute different actions, as described below.

In response to the Awake for Host command, the radio section sets the ready flag. This allows the terminal section to communicate directly with the radio section, to receive messages, to send messages ad to process commands. In response to the Resume command, the radio section turns off the ready flag to indicate that it is in an uncoordinated state, and the radio section can power down whenever it decides that it has finished with communications both with the radio 56 and with the terminal section 52. In this mode, the radio section will wakeup whenever a signal is received from the wakeup timer 99.

In response to the Sleep command, the radio section stops whatever operations it may have been carrying out, in the minimum amount of time, and then goes to a low power suspend mode. When the radio section receives a Resume message, it then reverts back to normal PSP mode.

Figure 7:
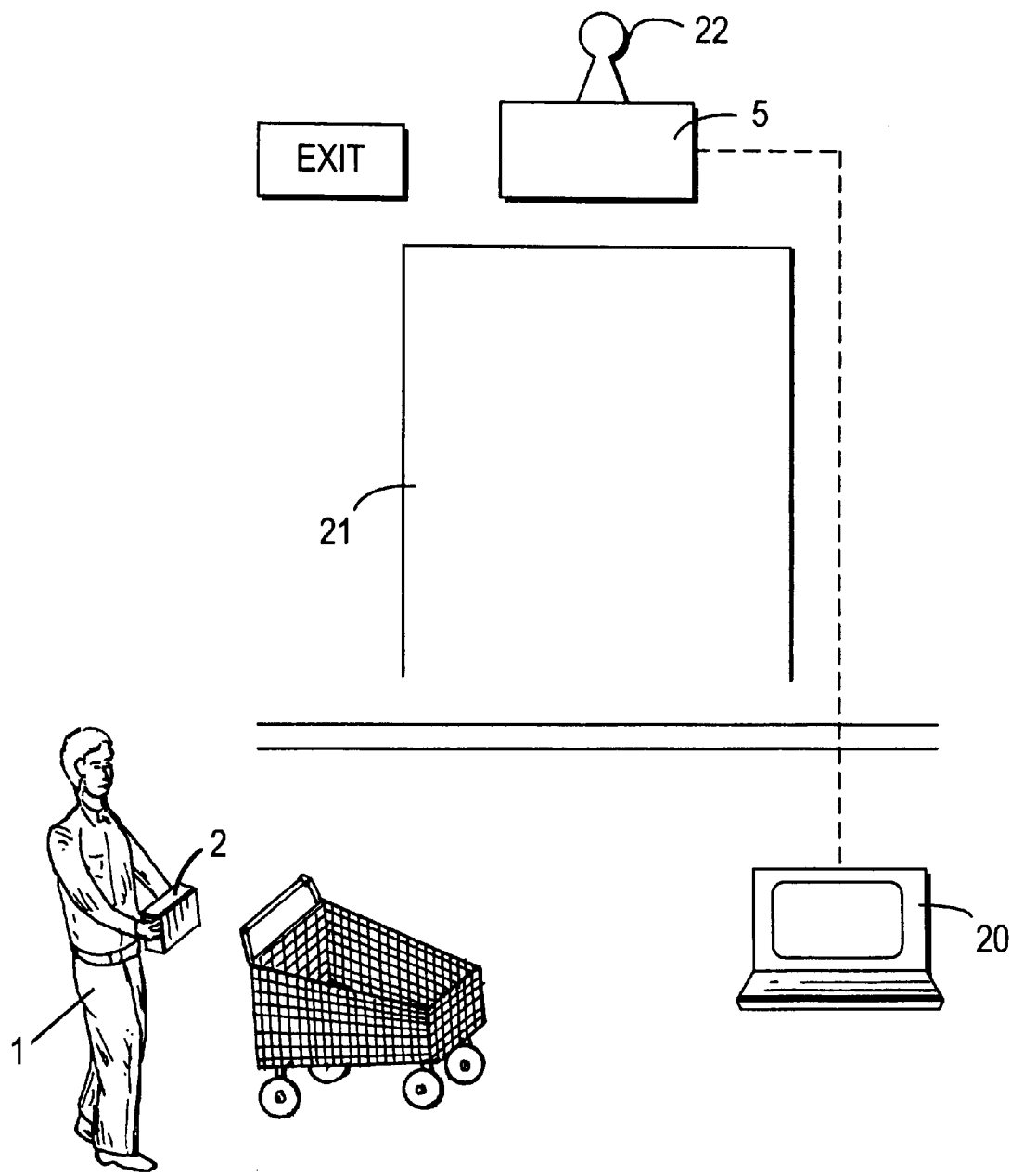
FIG. 7 is a schematic illustration showing a further embodiment of the communication system of the present invention.

A further embodiment of the invention is shown in FIG. 7. In some cases it may be desirable to provide information concerning the physical location of a mobile unit. For example the information may be provided to a system administrator 20 who may take action based on the information. Alternatively the house computer 4 may take action automatically on the basis of certain information.

For example, mobile units are often used in stock exchanges by traders for receiving orders and executing trades, as it is illegal to execute trades outside the building. In order, therefore, to determine whether a mobile unit is being removed from the building, access points 5 are provided adjacent each exit door 21. Each access point 5 is equipped with a directional (horn) antenna 22 designed to provide a strong signal over a narrow pattern in the vicinity of and covering the whole of the doorway. According to the roaming operation of the mobile units discussed above, any mobile unit will associate with an access point having high signal quality and which is lightly loaded and hence any mobile unit passing an access point 5 over an exit door 21 (when a mobile unit is being taken through the door) will associate with that access point. Once the system has detected that a mobile unit has associated with an access point over an exit door 21 the necessary steps can be taken by a house computer. For example an alert can be sounded which may in addition disable operation of the mobile unit. It is, of course, possible to identify which exit door the mobile unit was being taken through by identifying the physical location of the associated access point.

In the embodiment shown in FIG. 7 a cellular communications network is in use in a self-checkout retail system where wireless mobile units are provided to customers for the purpose of scanning their own purchases, for example, using bar code symbols. In that case an access point 5 provided over an exit 21 could be used to alert the store management 20 that a scanner was leaving the premises and to sound an alarm at the door.

Without further analysis, the foregoing will so fully reveal the gist of the present invention that others can readily adapt it for various applications without omitting features that, from the standpoint of prior art, fairly constitute essential characteristics of the generical or specific aspects of this invention and, therefore, such adaptions should and are intended to be comprehended without the meaning and range of equivalence of the following claims.

We claim:

1. An arrangement for maximizing battery life in each of a plurality of portable, battery-powered, mobile units, each of the mobile units being in wireless communication with a plurality of spaced-apart, stationary access points of a communications network, the arrangement comprising:

a) a radio in each of the mobile units, the radio having a transceiver for transmitting data to and from the access points within a predetermined working range in a powered mode of network operation;

b) a processor in each of the mobile units, the processor having a controller operatively connected to the transceiver; and c) a timer in each of the mobile units, for powering the radio only during the powered mode of network operation, and for reducing power to the radio to prevent data transmission by the transceiver during a power-saving mode of operation.

2. In a communications network including a plurality of spaced-apart stationary access points each of the access points being capable of wireless communication with portable, battery-powered, mobile units when within a working range from the access points, an arrangement for maximizing battery life in each of the mobile units, the arrangement comprising:

a) a radio section in each of the mobile units, the radio section having a transceiver for transmitting data to and from the access points in a powered mode of network operation;

b) a processor section in each of the mobile units, the processor section having electronic components including a control processor operatively connected to the transceiver; and c) a timer in each of the mobile units, for powering the radio section only during the powered mode of network operation.

3. The arrangement according to claim 2, wherein the control processor reduces battery power to the processor section in a suspended mode, and wherein the control processor controls the timer to reduce battery power to the transceiver when the processor section is in the suspended mode.

4. The arrangement according to claim 2, wherein the timer is operative for reducing power to the transceiver to prevent the transceiver from transmitting data in a power-saving mode of operation.

5. The arrangement according to claim 4; and further comprising an interface between the radio and processor sections of each of the mobile units, the transceiver of a respective radio section being operation for transmitting control data to and from the control processor via the interface.

6. The arrangement according to claim 5, wherein the network includes a host computer, each of the mobile units desiring access to the host computer being operative for selecting a most eligible access point from among the access points based on the control data received by the transceiver of the respective radio section.

7. The arrangement according to claim 6, wherein the mobile unit desiring access to the host computer transmits a probe message to the access points, receives response messages from the access points, and selects the most eligible access point based on the received response messages; and wherein the timer powers the radio section to the power-saving mode for each mobile unit not associated with an access point.

8. The arrangement according to claim 4, wherein one of the electronic components is a clock for timing the control processor, and wherein the timer is operative for halting the clock in the power-saving mode.

9. The arrangement according to claim 4, wherein each access point repeatedly transmits a broadcast beacon at predetermined intervals, and wherein the control processor controls the timer to power the radio section back to the powered mode upon receipt of the beacon.

10. The arrangement according to claim 9, wherein the radio section is powered to the powered mode upon receipt of every beacon.

11. The arrangement according to claim 9, wherein the radio section is powered to the powered mode upon receipt of every other beacon.

12. The arrangement according to claim 9, wherein the radio section is powered to the powered mode upon receipt of a predetermined number of beacons.

13. The arrangement according to claim 9, wherein the radio section is powered to the powered mode based on the number of transmissions of the data in a given time period.

14. The arrangement according to claim 9, wherein the radio section is powered to the powered mode upon elapse of a fixed time interval after receipt of the beacon.

15. The arrangement according to claim 9, wherein the radio section is powered to the powered mode upon elapse of a variable time interval after receipt of the beacon.

16. In a communications network including a plurality of spaced-apart stationary access points each of the access points being capable of wireless communication with portable, battery-powered, mobile units when within a working range from the access points, a method maximizing battery life in each of the mobile units, the method comprising the steps of:

a) transmitting data to and from the access points in a powered mode of network operation by providing a transceiver in each of the mobile units;

b) providing a processor section in each of the mobile units, the processor section having electronic components including a control processor, and operatively connecting the control processor to the transceiver; and c) powering the radio section with a timer only during the powered mode of network operation.

17. The method according to claim 16, wherein the control processor reduces battery power to the processor section in a suspended mode, and further comprising the step of controlling the timer to reduce battery power to the transceiver when the processor section is in the suspended mode.

18. The method according to claim 16, wherein the powering step is performed by reducing power to the transceiver to prevent the transceiver from transmitting data in a power-saving mode of operation.

19. The method according to claim 18, and further comprising the step of transmitting control data to and from the control processor via an interface provided between the radio and processor sections of each of the mobile units.

20. The method according to claim 19, wherein the network includes a host computer, each of the mobile units desiring access to the host computer being operative for selecting a most eligible access point from among the access points.

21. The method according to claim 20, wherein the mobile unit desiring access to the host computer transmits a probe message to the access points, and receives response messages from the access points, and selects the most eligible access point based on the received response messages, and further comprising the step of powering the radio section to the power-saving mode for each mobile unit not associated with an access point.

22. The method according to claim 18, wherein one of the electronic components is a clock for timing the control processor, and further comprising the step of halting the clock in the power-saving mode.

23. The method according to claim 18, wherein each access point repeatedly transmits a broadcast beacon at predetermined intervals, and further comprising the step of controlling the timer to power the radio section back to the powered mode upon receipt of the beacon.

24. The method according to claim 23, and further comprising the step of powering the radio section to the powered mode upon receipt of each beacon.

25. The method according to claim 23, and further comprising the step of powering the radio section to the powered mode upon receipt of every other beacon.

26. The method according to claim 23, and further comprising the step of powering the radio section to the powered mode upon receipt of a predetermined number of beacons.

27. The method according to claim 23, and further comprising the step of powering the radio section to the powered mode based on the number of transmissions of the data in a given time period.

28. The method according to claim 23, and further comprising the step of powering the radio section to the powered mode upon elapse of a fixed time interval after receipt of the beacon.

29. The method according to claim 23, and further comprising the step of powering the radio section to the powered mode upon elapse of a variable time interval after receipt of the beacon.

* * * * *